US012296942B2

(12) United States Patent
Seasly et al.

(10) Patent No.: US 12,296,942 B2
(45) Date of Patent: May 13, 2025

(54) CONTROL SURFACE LOCKING SYSTEM FOR TACTICAL FLIGHT VEHICLE

(71) Applicant: Raytheon Company, Waltham, MA (US)

(72) Inventors: Zachariah A. Seasly, Tucson, AZ (US); Edgar R. Melkers, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 209 days.

(21) Appl. No.: 17/929,127

(22) Filed: Sep. 1, 2022

(65) Prior Publication Data
US 2023/0356828 A1 Nov. 9, 2023

Related U.S. Application Data

(60) Provisional application No. 63/239,549, filed on Sep. 1, 2021.

(51) Int. Cl.
*B64C 13/34* (2006.01)
*B64C 13/38* (2006.01)
*F42B 10/14* (2006.01)

(52) U.S. Cl.
CPC .............. *B64C 13/34* (2013.01); *B64C 13/38* (2013.01); *F42B 10/14* (2013.01)

(58) Field of Classification Search
CPC ......... B64C 13/34; B64C 13/38; B64C 13/28; F42B 10/14; F42B 10/64
See application file for complete search history.

(56) References Cited

U.S. PATENT DOCUMENTS

| 4,575,025 A | * | 3/1986 | Sadvary | F42B 10/14 |
| | | | | 244/49 |
| 4,795,110 A | * | 1/1989 | Lang | B64C 13/341 |
| | | | | 244/3.21 |
| 5,950,963 A | * | 9/1999 | Speicher | F42B 10/64 |
| | | | | 244/3.21 |

(Continued)

FOREIGN PATENT DOCUMENTS

GB 2065042 A * 6/1981 ............. B64C 13/38

OTHER PUBLICATIONS

International Search Report and Written Opinion mailed Nov. 29, 2022 in corresponding International Application No. PCT/US2022/075827.

*Primary Examiner* — Assres H Woldemaryam
(74) *Attorney, Agent, or Firm* — Schwegman Lundberg & Woessner, P.A.

(57) ABSTRACT

A control surface restraining system for variably preventing movement of a control surface imparted by a control actuation shaft of a control actuation section of a tactical flight vehicle includes a power take-off shaft operably connected to the control actuation shaft with a power take-off gear train and a control surface restraint. The control surface restraint is configured to variably engage the power take-off shaft, thereby locking the power take-off gear train and preventing the control actuation shaft from imparting the movement of the control surface. The control surface restraint is also configured to variably disengage the power take-off shaft, thereby unlocking power take-off gear train and allowing the control actuation shaft from imparting the movement of the control surface.

23 Claims, 4 Drawing Sheets

(56) References Cited

U.S. PATENT DOCUMENTS

| | | | |
|---|---|---|---|
| 7,316,370 B2 | 1/2008 | Sankovic et al. | |
| 2005/0151000 A1* | 7/2005 | Dodu | F42B 10/64 |
| | | | 244/3.24 |
| 2007/0007383 A1* | 1/2007 | Hsu | F42B 10/64 |
| | | | 244/3.24 |
| 2014/0021289 A1* | 1/2014 | Bugge | F42B 10/14 |
| | | | 244/3.24 |

* cited by examiner

CONTROL SURFACE LOCKING SYSTEM FOR TACTICAL FLIGHT VEHICLE

RELATED APPLICATION

This application claims the benefit of U.S. Application No. 63/239,549, filed Sep. 1, 2021, which is hereby incorporated herein by reference in its entirety.

TECHNICAL FIELD

The present disclosure relates generally to tactical flight vehicles and more particularly to control surface locking systems for tactical flight vehicles.

BACKGROUND

Tactical flight vehicles, such as missiles and rockets, often have one or more control surfaces, such as tail fins, elevators, ailerons, elevons, rudders, flaps, slats, etc., mounted to the tactical flight vehicle for controlling a flight path thereof. Air-launched tactical flight vehicles require a control surface locking system for locking the control surfaces in place during captive carry (while the tactical flight vehicle is being carried by a carrying aircraft prior to launch). Such control surface locking systems are configured to prevent motion of the control surfaces from affecting the carrying aircraft's flight dynamics, avoid damage to the control surface actuation mechanism, and ensure proper control surface alignment and position for safe egress at launch. Existing control surface locking systems are designed into the control actuation section of the air-launched tactical flight vehicle and are configured to directly engage the control surface or actuator output shaft with a pin or other mechanical device.

In surface-launched tactical flight vehicles, which do not require such a control surface locking system, there is typically no available space inside the existing control actuation section. Accordingly, surface-launched tactical flight vehicles are generally unable to be repurposed for air-launched applications, as there is no room for a conventional control surface locking system to be designed into the existing control actuation section. Prior solutions for implementing a control surface locking system in a repurposed surface-launched tactical flight vehicle having involved external devices which interface directly with the control surfaces.

SUMMARY

A control surface restraining system for use in a surface-launched tactical flight vehicle repurposed for an air-launched application is designed to variably restrain the power take-off shafts from the control actuation section, instead of directly interfacing with the control surfaces, themselves, or the actuator output shafts as in previous designs. The power take-off shafts, which are typically used to drive a thrust vector control system in vertical surface-launched applications, are unused when the surface-launched tactical flight vehicle is repurposed for the air-launched application. Accordingly, the control surface restraining system is configured to be packaged into the space originally allocated to the thrust vector control system. The control surface restraining system is therefore configured to lock the control surface actuators at the existing power take-off shafts, instead of directly locking the control surface or the control surface actuator output shaft. This allows the control surface restraining system to be completely external to the control actuation section such that no internal modification of the existing control actuation section is necessary for use with the control surface restraining system.

According to an aspect of this disclosure, a control surface restraining system for variably preventing movement of a control surface imparted by a control actuation shaft of a control actuation section of a tactical flight vehicle includes a power take-off shaft operably connected to the control actuation shaft with a power take-off gear train. The control surface restraining system also includes a control surface restraint configured to variably engage the power take-off shaft, thereby locking the power take-off gear train and preventing the control actuation shaft from imparting the movement of the control surface. The control surface restraint is also configured to variably disengage the power take-off shaft, thereby unlocking power take-off gear train and allowing the control actuation shaft from imparting the movement of the control surface.

According to an embodiment of any paragraph(s) of this summary, the control surface restraint includes a lock ring rotatable around a longitudinal axis of the tactical flight vehicle between a first position and a second position. The control surface restraint also includes a pin movable between a ring-engaged position in which the pin engages the lock ring and maintains the lock ring in the first position, and a ring-disengaged position in which the pin disengages the lock ring. The control surface restraint also includes a ring biasing member fixed to the lock ring and configured to move the lock ring from the first position to the second position when the pin is in the ring-disengaged position. The control surface restraint also includes a control surface lock moveable between a shaft-engaged position in which the control surface lock engages the power take-off shaft, and a shaft-disengaged position in which the control surface lock disengages the power take-off shaft. The control surface lock is in the shaft-engaged position when the lock ring is in the first position and the control surface lock is in the shaft-disengaged position when the lock ring is in the second position.

According to an embodiment of any paragraph(s) of this summary, the lock ring includes an unlocking slot configured to engage the control surface lock when the lock ring is in the second position and the control surface lock is in the shaft-disengaged position.

According to an embodiment of any paragraph(s) of this summary, the control surface lock includes a lock biasing member configured to move the control surface lock from the shaft-engaged position to the shaft-disengaged position in which the unlocking slot engages the control surface lock when the lock ring is in the second position.

According to an embodiment of any paragraph(s) of this summary, the lock biasing member is a spring, According to an embodiment of any paragraph(s) of this summary, the ring biasing member is a spring.

According to an embodiment of any paragraph(s) of this summary, the lock ring includes a camming slot and the control surface lock includes a cam configured to slide along the camming slot when the lock ring rotates between the first position and the second position.

According to an embodiment of any paragraph(s) of this summary, the cam is configured to move the control surface lock from the shaft-engaged position to the shaft-disengaged position as it slides along the camming slot when the lock ring rotates from the first position to the second position.

According to an embodiment of any paragraph(s) of this summary, the camming slot is angled.

According to an embodiment of any paragraph(s) of this summary, the control surface restraint includes a lock frame including a control surface lock and a lock pin. The lock frame is moveable between a shaft-engaged position in which the control surface lock engages the power take-off shaft and a shaft-disengaged position in which the control surface lock disengages the power take-off shaft. The control surface restraint also includes a lock ring including a locking pin slot. The lock ring is rotatable around a longitudinal axis of the tactical flight vehicle between a first position in which the lock pin of the lock frame engages the locking pin slot of the lock ring, thereby maintaining the lock frame in the shaft-engaged position, and a second position in which the lock pin of the lock frame disengages the locking pin slot of the lock ring. The control surface restraint also includes a frame biasing member configured to move the lock frame from the shaft-engaged position to the shaft-disengaged position when the lock ring is in the second position.

According to an embodiment of any paragraph(s) of this summary, the frame biasing member is a spring.

According to another aspect of this disclosure, a method of variably restraining movement of a control surface imparted by a control actuation shaft of a control actuation section of a tactical flight vehicle includes a step of engaging, with a control surface restraint, a power take-off shaft of the control actuation section. The power take-off shaft is operably connected to the control actuation shaft with a power take-off gear train. Accordingly, the power take-off gear train is locked and prevents the control actuation shaft from imparting the movement of the control surface. The method also includes a step of disengaging, with the control surface restraint, the power take-off shaft of the control actuation section such that the power take-off gear train is unlocked and allows the control actuation shaft to impart the movement of the control surface.

According to an embodiment of any paragraph(s) of this summary, the step of engaging includes disposing a lock ring of the control surface restraint in a first position in which a pin engages the lock ring to maintain the lock ring in the first position, and a control surface lock of the control surface restraint engages the power take-off shaft.

According to an embodiment of any paragraph(s) of this summary, the step of disengaging includes moving the pin out of engagement with the lock ring, rotating the lock ring from the first position to the second position, and disengaging the control surface lock of the control surface restraint from the power take-off shaft.

According to an embodiment of any paragraph(s) of this summary, rotating the lock ring from the first position to the second position includes moving the lock ring with a force of a ring biasing member when the pin is moved out of engagement with the lock ring.

According to an embodiment of any paragraph(s) of this summary, disengaging the control surface lock includes moving the control surface lock with a force of a lock biasing member out of engagement with the power take-off shaft and into engagement with an unlocking slot of the lock ring when the lock ring is moved to the second position.

According to an embodiment of any paragraph(s) of this summary, disengaging the control surface lock includes sliding a cam of the control surface lock along a camming slot of the lock ring as the lock ring rotates from the first position to the second position.

According to an embodiment of any paragraph(s) of this summary, the step of engaging includes providing a lock frame having a control surface lock in a shaft-engaged position in which the control surface lock engages the power take-off shaft and having a lock pin engaged with a locking pin slot of a lock ring thereby maintaining the lock frame in the shaft-engaged position According to an embodiment of any paragraph(s) of this summary, the step of disengaging includes moving the lock ring from a first position to a second position in which the lock pin of the lock frame disengages the locking pin slot of the lock ring.

According to an embodiment of any paragraph(s) of this summary, the step of disengaging includes moving the lock frame from the shaft-engaged position to a shaft-disengaged position in which the control surface lock disengages the power take-off shaft when the lock ring is moved from the first position to the second position and the lock pin of the lock frame disengages the locking pin slot of the lock ring.

The following description and the annexed drawings set forth in detail certain illustrative embodiments described in this disclosure. These embodiments are indicative, however, of but a few of the various ways in which the principles of this disclosure may be employed. Other objects, advantages and novel features will become apparent from the following detailed description when considered in conjunction with the drawings.

BRIEF DESCRIPTION OF DRAWINGS

The annexed drawings show various aspects of the disclosure.

DETAILED DESCRIPTION

Figure 1:
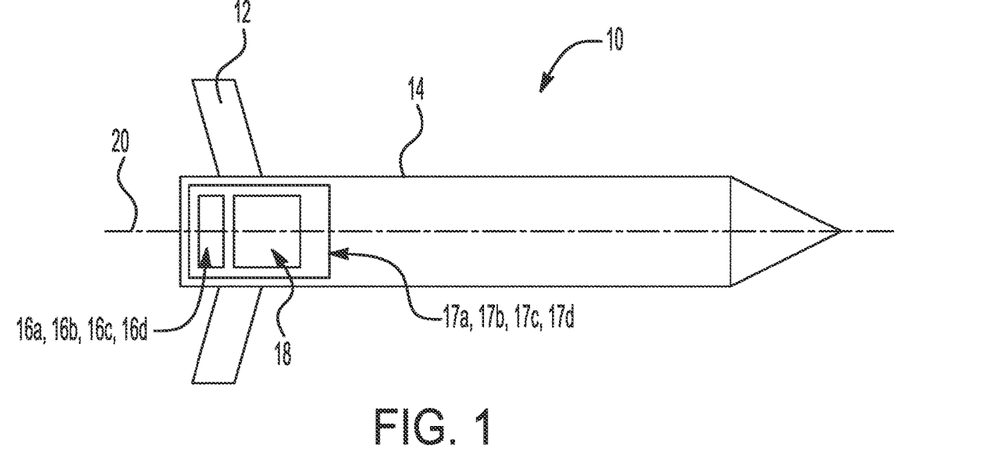
FIG. 1 is a schematic diagram of a tactical flight vehicle.

According to a general embodiment, a control surface restraining system for variably restraining a control surface on a tactical flight vehicle is described. With reference to FIG. 1, a general schematic of a tactical flight vehicle 10 is depicted. The tactical flight vehicle 10 may be, for example, a missile or a rocket. The tactical flight vehicle 10 includes at least one control surface 12 mounted to the tactical flight vehicle 10 on an airframe 14 of the tactical flight vehicle 10. In the embodiment shown and described herein, the at least one control surface 12 is a tail fin. It is understood, however, that aspects of this disclosure may be applicable to other types of control surfaces, such as elevators, ailerons, elevons, rudders, flaps, slats, etc. The tactical flight vehicle 10 includes a control surface restraining system 17a, 17b, 17c, 17d located within the airframe 14 of the tactical flight vehicle 10. The control surface restraining system 17a, 17b, 17c, 17d includes a control surface restraint 16a, 16b, 16c, 16d configured to interface with a control actuation section 18 of the tactical flight vehicle 10. For example, when the tactical flight vehicle 10 is originally configured as a surface-launched tactical flight vehicle and is repurposed for an air-launched application, the control surface restraint 16a, 16b, 16c, 16d is configured to be packaged into the space originally allocated for a thrust vector control system within the airframe 14, which is unused in the air-launched application. Therefore, taking the place of a thrust vector control system, the control surface restraint 16a, 16b, 16c, 16d is configured to interface with the existing control actuation section 18, specifically the power take-off shafts of the existing control actuation section, as will be described in more detail below. The control surface restraining system 17a, 17b, 17c, 17d is configured to restrain the control surface 12 and maintain the control surface 12 in a "zero position" (i.e., aligned with a longitudinal axis 20 of the tactical flight vehicle 10) prior to launch of the tactical flight vehicle 10 and initialization of the control actuation section 18. When it is time for the control actuation section 18 to control the control surface 12 during flight of the tactical flight vehicle 10, the control surface restraining system 17a, 17b, 17c, 17d is configured to release the control surface 12 and allow movement thereof.

Figure 2:
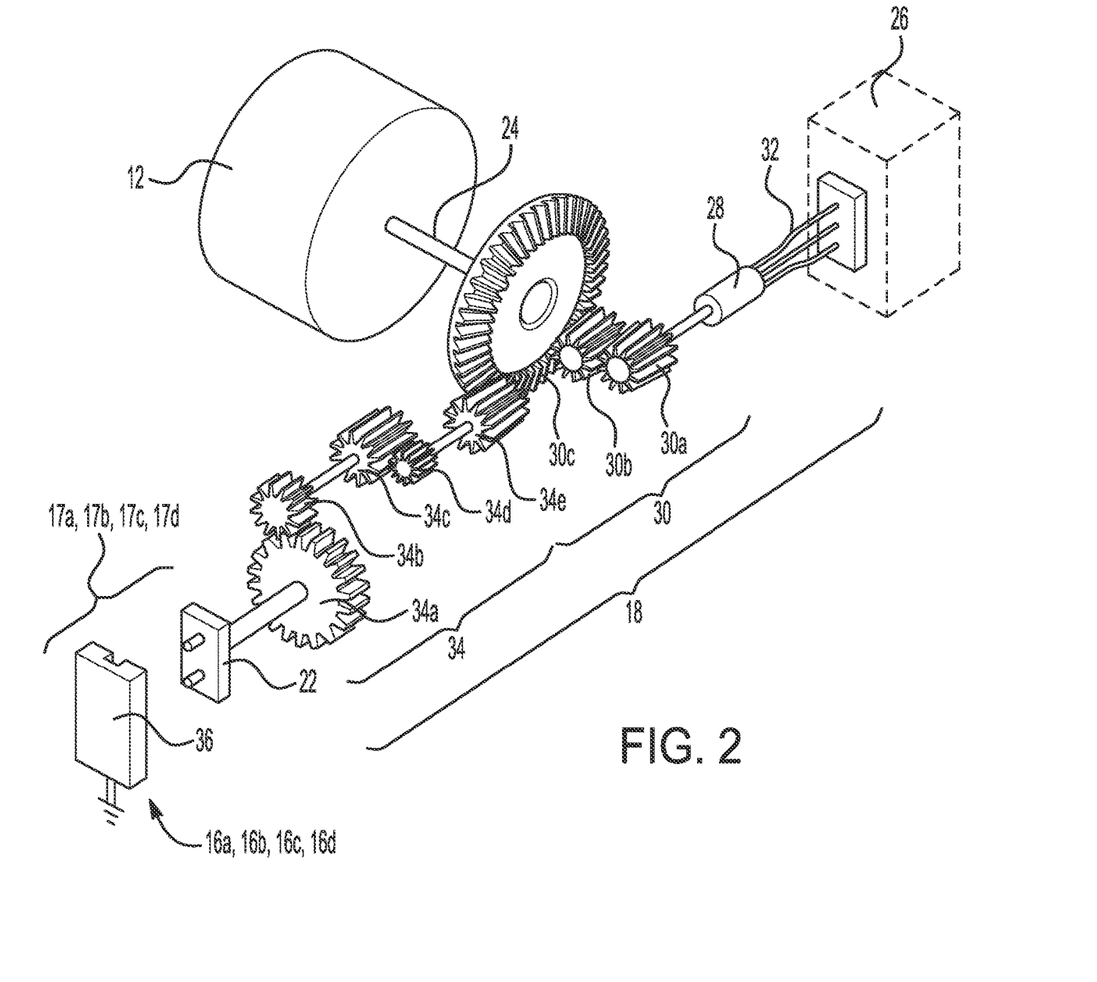
FIG. 2 is an exploded schematic diagram of a control surface restraining system within the tactical flight vehicle.

Now turning to FIG. 2, the control surface restraining system 17a, 17b, 17c, 17d will be described in more detail. The control surface restraining system 17a, 17b, 17c, 17d includes the control surface restraint 16a, 16b, 16c, 16d (shown in part in FIG. 2), including a control surface lock 36, and at least one power take-off shaft 22 of the control actuation section 18. The control actuation section 18 includes a control actuation shaft 24 configured to impart motion to the control fin 12 based on a control by a controller 26 (depicted schematically with a dashed box in FIG. 2) and associated actuation of a motor 28. Accordingly, the control actuation shaft 24 is operably coupled to the motor 28 via a control actuation geartrain 30 including a plurality of gears 30a, 30b, 30c, etc. The motor 28 is operably coupled to the controller 26 via a harness 32, for example a wiring harness. The power take-off shaft 22 of the control actuation section 18 is operably connected to the control actuation shaft 24 via a power take-off gear train 34 including a plurality of gears 34a, 34b, 34c, 34d, 34e, etc. Specifically, for example, the power take-off gear train 34 is operably coupled to the control actuation gear train 30 which is operably coupled to the control actuation shaft 24. The control surface lock 36 of the control surface restraining system 16a, 16b, 16c, 16d is configured to variably engage the power take-off shaft 22, thereby locking the power take-off gear train 34 and preventing the control actuation shaft 24 from imparting any movement to the control surface 12. The control surface lock 36 is also configured to variably disengage the power take-off shaft 22 at required times for system functional performance, thereby unlocking the power take-off gear train 34 and allowing the control actuation shaft 24 to impart movement to the control surface 12.

Figure 3:
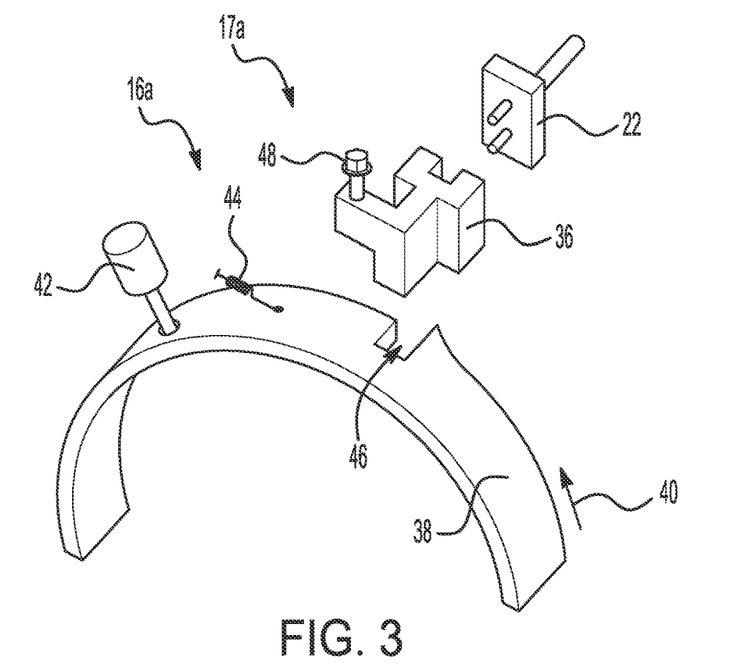
FIG. 3 is an exploded schematic diagram of a control surface restraint of the control surface restraining system.
Figure 4:
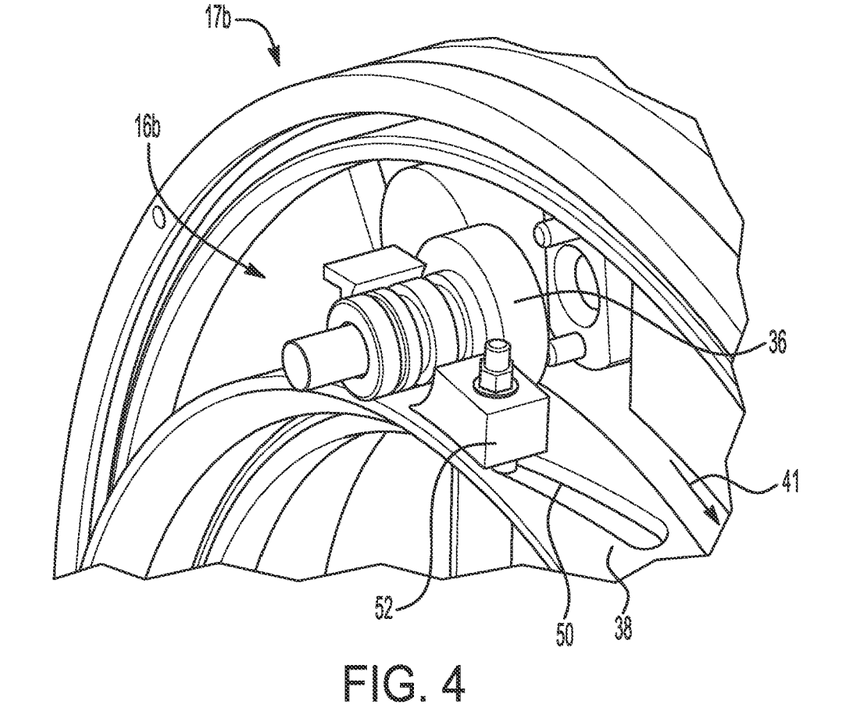
FIG. 4 is a perspective view of another control surface restraint of the control surface restraining system.

In the embodiments depicted in FIGS. 3-4, the control surface restraint 16a, 16b of the control surface restraining system 17a, 17b includes a lock ring 38 rotatable around the longitudinal axis 20 of the tactical flight vehicle 10 between a first position and a second position. The lock ring 38 is depicted in FIG. 3 in the first position and is rotatable in the direction of the arrow 40 to move from the depicted first position to the second position. As depicted in FIG. 3, the control surface restraint 16a also includes a pin 42 moveable between a ring-engaged position in which the pin 42 engages the lock ring 38 and maintains the lock ring 38 in the first position, and a ring-disengaged position in which the pin 42 disengages the lock ring 38. The pin 42 is depicted in FIG. 3 in the ring-engaged position, thereby maintaining the lock ring 38 in the depicted first position. The pin 42 is moveable by a pin puller.

The control surface restraint 16a includes a ring biasing member 44 fixed to the lock ring 38 on one end thereof and fixed to the airframe at another end thereof, and configured to move the lock ring 38 from the first position to the second position in the direction of the arrow 40 when the pin 42 is moved to the ring-disengaged position. That is, when the pin 42 is moved from the ring-engaged position to the ring-disengaged position, the pin 42 no longer maintains the lock ring 38 in the first position, thereby allowing a force of the ring biasing member 44 to move the lock ring 38 to the second position. The ring biasing member 44 may be any device configured to apply a force, for example, a spring. Other examples of the ring biasing member 44 may include a gas generator, a pneumatic cylinder, a solenoid, or a permanent magnet.

The control surface lock 36 of the control surface restraint 16a, mentioned above, is moveable between a shaft-engaged position in which the control surface lock 36 engages the power take-off shaft 22, and a shaft-disengaged position in which the control surface lock 36 disengages the power take-off shaft 22. The control surface lock 36 is in the shaft-engaged position when the lock ring 38 is in the first position and is in the shaft-disengaged position when the lock ring 38 is in the second position. That is, when the pin 42 is moved from the ring-engaged position to the ring-disengaged position, the ring biasing member 44 moves the lock ring 38 from the first position to the second position, thereby causing the control surface lock 36 to move from the shaft-engaged position to the shaft-disengaged position, as will be described in more detail below.

For example, in the embodiment depicted in FIG. 3, the lock ring 38 of the control surface restraint 16a includes an unlocking slot 46 configured to engage the control surface lock 36 when the lock ring 38 is in the second position. Specifically, the control surface lock 36 includes a lock biasing member 48 configured to move the control surface lock 36 from the lock-engaged position to the lock-disengaged position, in which the unlocking slot 46 of the lock ring 38 in the second position engages the control surface lock 36.

In another embodiment depicted in FIG. 4, the lock ring 38 of the control surface restraint 16b includes a camming slot 50 and the control surface lock 36 includes a cam 52 configured to slide along the camming slot 50 as the lock ring 38 moves from the first position to the second position. In FIG. 4, the lock ring 38 is depicted in the second position, moved from the first position in the direction of the arrow 41. In this manner, as the lock ring 38 moves from the first position to the second position, the cam 52 of the control surface lock 36 slides along the camming slot 50 and moves the control surface lock 36 from the shaft-engaged position to the shaft-disengaged position. The control surface lock 36 is depicted in the shaft-disengaged position in FIG. 4.

Figure 5:
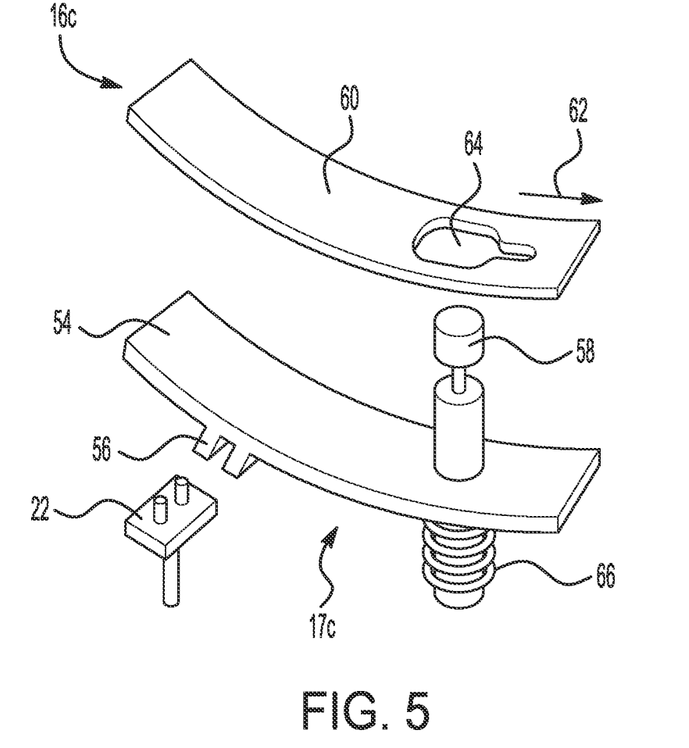
FIG. 5 is an exploded schematic diagram of another control surface restraint of the control surface restraining system.

Another embodiment of the control surface restraint 17c is depicted in FIG. 5. In this embodiment, the control surface restraint 16c includes a lock frame 54 including a control surface lock 56 and a lock pin 58. The lock frame 54 is moveable between a shaft-engaged position in which the control surface lock 56 engages the power take-off shaft 22, and a shaft-disengaged position in which the control surface lock 56 disengages the power take-off shaft 22. The control surface restraint 16c includes a lock ring 60 that is rotatable around the longitudinal axis 20 of the tactical flight vehicle 10 between a first position and a second position. The lock ring 60 is depicted in the second position in FIG. 5, rotated from the first position along a direction of the arrow 62.

The lock ring 60 includes a locking pin slot 64. The locking pin slot 64 may have a keyhole shape such that the lock pin 58 can engage the locking pin slot 64 in a narrower portion of the keyhole shape and freely move relative to the locking pin slot 64 in a wider portion of the keyhole shape. For example, in the first position of the lock ring 60, the lock pin 58 of the lock frame 54 engages the locking pin slot 64 of the lock ring 60, thereby maintaining the lock frame 54 in the shaft-engaged position. In the second position of the lock ring 60, the lock pin 58 of the lock frame 54 disengages the locking pin slot 64 of the lock ring 60. The control surface restraint 16c includes a frame biasing member 66 configured to move the lock frame 54 from the shaft-engaged position to the shaft-disengaged position when the lock ring 60 is in the second position. That is, when the lock ring 60 is moved from the first position to the second position and the lock pin 58 of the lock frame 54 disengages the locking pin slot 64, the lock pin 58 no longer maintains the lock frame 54 in the shaft-engaged position. Accordingly, a force of the frame biasing member 66 is able to move the lock frame 54 from the shaft-engaged position to the shaft-disengaged position. The frame biasing member 66 may be any device configured to apply a force, for example, a loaded spring. Other examples of the frame biasing member 66 may include a gas generator, a pneumatic cylinder, a solenoid, or a permanent magnet.

Figure 6:
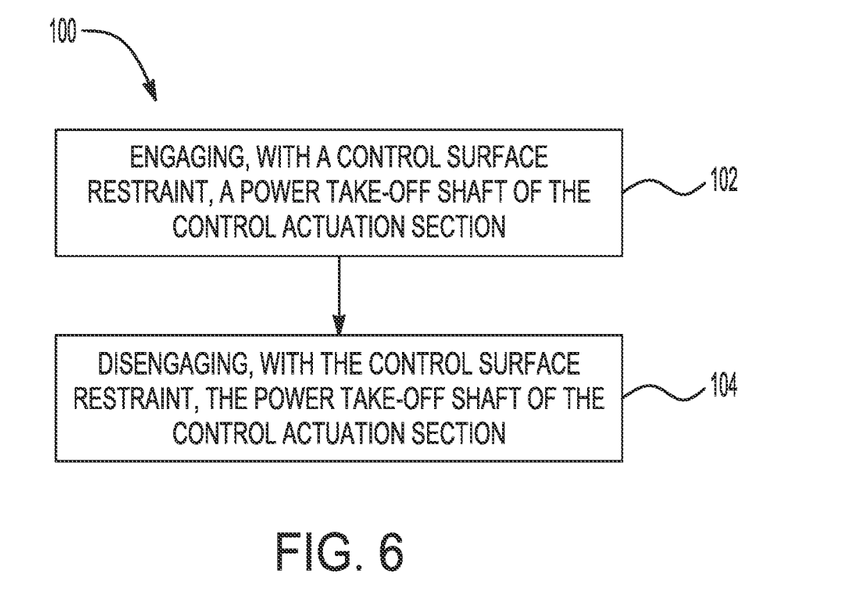
FIG. 6 is a flowchart of a method of variably restraining movement of a control surface of the tactical flight vehicle.

FIG. 6 depicts a flowchart of a method 100 of variably restraining movement of a control surface imparted by a control actuation shaft of a control actuation section of a tactical flight vehicle. For example, the method 100 may be performed on the tactical flight vehicle 10 described herein (FIG. 1). The method 100 includes a step 102 of engaging, with a control surface restraint, a power take-off shaft of the control actuation section. The control surface restraint may be the same as the control surface restraint 16a, 16b, 16c, 16d described herein (FIGS. 3, 4, 5, and 7 respectively). The power take-off shaft is operably connected to the control actuation shaft with a power take-off gear train. When the power take-off shaft of the control actuation section is engaged, therefore, the power take-off gear train is locked and prevents the control actuation shaft from imparting the movement of the control surface. The method 100 also includes a step 104 of disengaging, with the control surface restraint, the power take-off shaft of the control actuation section such that the power take-off gear train is unlocked and allows the control actuation shaft to impart movement of the control surface.

The step 102 of engaging may include disposing a lock ring of the control surface restraint in a first position in which a pin engages the lock ring to maintain the lock ring in the first position. For example, the lock ring may be that of the embodiment of the control surface restraint 16a depicted in FIG. 3. In the first position of the lock ring, therefore, a control surface lock of the control surface restraint engages the power take-off shaft. The step 104 of disengaging may therefore include moving the pin out of engagement with the lock ring, rotating the lock ring from the first position to the second position, and disengaging the control surface lock of the control surface restraint from the power take-off shaft. Rotating the lock ring from the first position to the second position may include moving the lock ring with a force of a ring biasing member, such as a spring, when the pin in moved out of engagement with the lock ring.

Disengaging the control surface lock may include moving the control surface lock with a force of a lock biasing member out of engagement with the power take-off shaft and into engagement with an unlocking slot of the lock ring when the lock ring is moved to the second position. For example, disengaging the control surface lock may include the lock biasing member 48 and unlocking slot 46 depicted in the embodiment of the control surface restraint 16a depicted in FIG. 3. Alternatively, disengaging the control surface lock may include sliding a cam of the control surface lock along a camming slot of the lock ring as the lock ring rotates from the first position to the second position. For example, disengaging the control surface lock may include the interaction of the cam 52 and camming slot 50 depicted in the embodiment of the control surface restraint 16b depicted in FIG. 4.

In another embodiment, the step 102 of engaging may include providing a lock frame having a control surface lock in a shaft-engaged position. For example, the lock frame may be that of the embodiment of the control surface restraint 16c depicted in FIG. 5. In the shaft-engaged position, the control surface lock engages the power take-off shaft. The lock frame also has a lock pin engaged with a locking pin slot of a lock ring, thereby maintaining the lock frame in the shaft-engaged position. The step 104 of disengaging includes moving the lock ring from a first position to a second position in which the lock pin of the lock frame disengages the locking pin slot of the lock ring. Specifically, the step 104 of disengaging may include moving the lock frame from the shaft-engaged position to a shaft-disengaged position in which the control surface lock disengages the power take-off shaft when the lock ring is moved from the first position to the second position and the lock pin of the lock frame disengages the locking pin slot of the lock ring.

Figure 7:
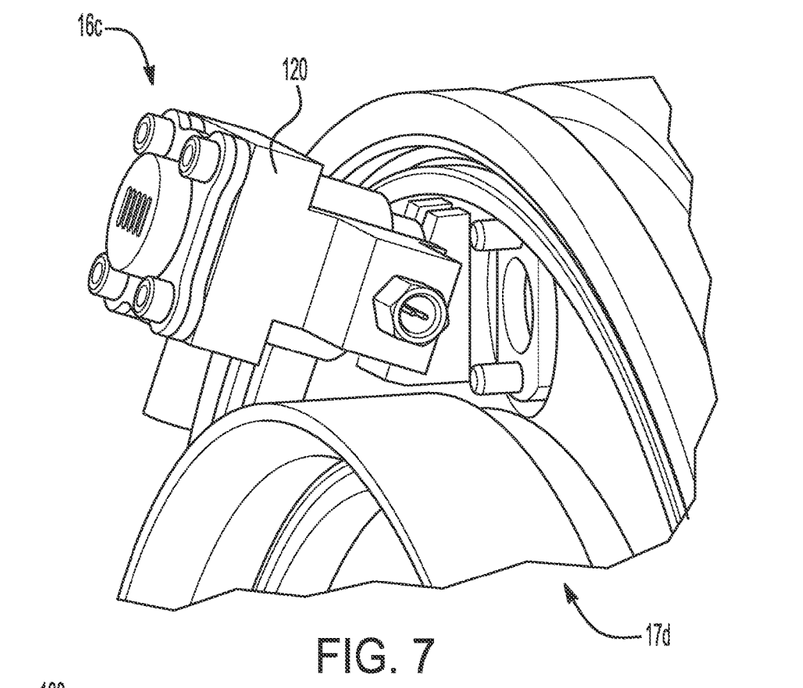
FIG. 7 is a perspective view of another control surface restraint of the control surface restraining system.

FIG. 7 depicts another embodiment of a pin puller 120 of the control surface restraint 16d of the control surface restraining system 17d that uses a single pin puller per power take-off shaft. The pin puller 120 may retract due to a pyro initiation, or may be implemented as other devices such as an electromagnetic solenoid, a rack-and-pinion, a pneumatic or hydraulic device, or any other device that can provide a linear motion. This embodiment of the control surface restraint 16d is unique in that it is a linear device, acting in the aft direction as opposed to the rotational devices used in the other embodiments of the control surface restraint 16a, 16b, and 16c.

Figure 8:
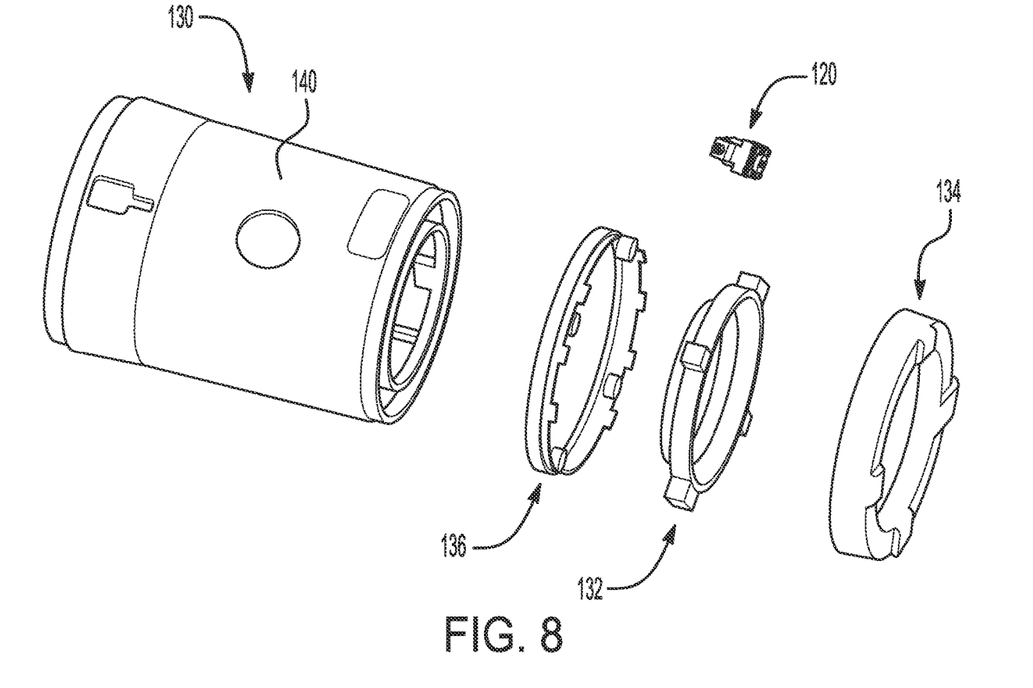
FIG. 8 is an exploded view of the control surface restraint of FIG. 7 as part of a control surface restraining system.

FIG. 8 is exploded view of the pin puller 120 as part of a larger control surface restraining system 130. The pin puller 120 is mounted on a pin puller mount 132, which may be covered by a pin puller shroud 134. A clamp 136, such as a Marman clamp, may be used to claim the parts 132 and 134 to a main control actuation system body 140. Other aspects may be similar to the control surface restraining system 17a, 17b, 17c, 17d (FIG. 1) and the control surface restraint 16a, 16b, 16c, 16d (FIG. 1) described herein.

As another alternative, the mechanism to restrain a power take-off shaft may include an ejectable fixed restraint.

Although the above disclosure has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments. In addition, while a particular feature may have been described above with respect to only one or more of several illustrated embodiments, such feature may be combined with one or more other features of the other embodiments, as may be desired and advantageous for any given or particular application.

What is claimed is:

1. A control surface restraining system for preventing movement of a control surface imparted by a control actuation shaft of a control actuation section of a tactical flight vehicle, the control surface restraining system comprising:
    a power take-off shaft operably connected to the control actuation shaft with a power take-off gear train; and
    a control surface restraint configured to:
        engage the power take-off shaft, thereby locking the power take-off gear train and preventing the control actuation shaft from imparting the movement of the control surface, and
        disengage the power take-off shaft, thereby unlocking the power take-off gear train and allowing the control actuation shaft from imparting the movement of the control surface;
    wherein the control surface restraint includes:
        a lock ring rotatable between a first position and a second position;
        a pin movable between a ring-engaged position in which the pin engages the lock ring and maintains the lock ring in the first position, and a ring-disengaged position in which the pin disengages the lock ring;
        a ring biasing member fixed to the lock ring and configured to move the lock ring from the first position to the second position when the pin is in the ring-disengaged position; and
        a control surface lock moveable between a shaft-engaged position in which the control surface lock engages the power take-off shaft, and a shaft-disengaged position in which the control surface lock disengages the power take-off shaft, the control surface lock being in the shaft-engaged position when the lock ring is in the first position and the control surface lock being in the shaft-disengaged position when the lock ring is in the second position.

2. The control surface restraining system according to claim 1, wherein the lock ring includes an unlocking slot configured to engage the control surface lock when the lock ring is in the second position and the control surface lock is in the shaft-disengaged position.

3. The control surface restraining system according to claim 2, wherein the control surface lock includes a lock biasing member configured to move the control surface lock from the shaft-engaged position to the shaft-disengaged position in which the unlocking slot engages the control surface lock when the lock ring is in the second position.

4. The control surface restraining system according to claim 3, wherein the lock biasing member is a spring.

5. The control surface restraining system according to claim 1, wherein the ring biasing member is a spring.

6. The control surface restraining system according to claim 1, wherein the lock ring includes a camming slot and the control surface lock includes a cam configured to slide along the camming slot when the lock ring rotates between the first position and the second position.

7. The control surface restraining system according to claim 6, wherein the cam is configured to move the control surface lock from the shaft-engaged position to the shaft-disengaged position as it slides along the camming slot when the lock ring rotates from the first position to the second position.

8. The control surface restraining system according to claim 6, wherein the camming slot is angled.

9. A control surface restraining system for preventing movement of a control surface imparted by a control actuation shaft of a control actuation section of a tactical flight vehicle, the control surface restraining system comprising:
    a power take-off shaft operably connected to the control actuation shaft with a power take-off gear train; and
    a control surface restraint configured to:
        engage the power take-off shaft, thereby locking the power take-off gear train and preventing the control actuation shaft from imparting the movement of the control surface, and
        disengage the power take-off shaft, thereby unlocking power take-off gear train and allowing the control actuation shaft from imparting the movement of the control surface;
    wherein the control surface restraint includes:
        a lock frame including a control surface lock and a lock pin, the lock frame being moveable between a shaft-engaged position in which the control surface lock engages the power take-off shaft and a shaft-disengaged position in which the control surface lock disengages the power take-off shaft;
        a lock ring including a locking pin slot, the lock ring being rotatable between a first position in which the lock pin of the lock frame engages the locking pin slot of the lock ring, thereby maintaining the lock frame in the shaft-engaged position, and a second position in which the lock pin of the lock frame disengages the locking pin slot of the lock ring; and
        a frame biasing member configured to move the lock frame from the shaft-engaged position to the shaft-disengaged position when the lock ring is in the second position.

10. The control surface restraining system according to claim 9, wherein the frame biasing member is a spring.

11. A method of variably restraining movement of a control surface imparted by a control actuation shaft of a control actuation section of a tactical flight vehicle, the method comprising:
    engaging, with a control surface restraint, a power take-off shaft of the control actuation section, the power take-off shaft being operably connected to the control actuation shaft with a power take-off gear train, such that the power take-off gear train is locked and prevents the control actuation shaft from imparting the movement of the control surface; and
    disengaging, with the control surface restraint, the power take-off shaft of the control actuation section such that the power take-off gear train is unlocked and allows the control actuation shaft to impart the movement of the control surface;
    wherein the engaging includes disposing a lock ring of the control surface restraint in a first position in which a pin engages the lock ring to maintain the lock ring in the first position, and a control surface lock of the control surface restraint engages the power take-off shaft.

12. The method according to claim 11, wherein the disengaging includes:
    moving the pin out of engagement with the lock ring,
    rotating the lock ring from the first position to a second position, disengaging the control surface lock of the control surface restraint from the power take-off shaft.

13. The method according to claim 12, wherein rotating the lock ring from the first position to the second position includes moving the lock ring with a force of a ring biasing member when the pin is moved out of engagement with the lock ring.

14. The method according to claim 11, wherein the disengaging the control surface lock includes moving the control surface lock with a force of a lock biasing member out of engagement with the power take-off shaft and into engagement with an unlocking slot of the lock ring when the lock ring is moved to the second position.

15. The method according to claim 11, wherein the disengaging the control surface lock includes sliding a cam of the control surface lock along a camming slot of the lock ring as the lock ring rotates from the first position to the second position.

16. The method according to claim 11, wherein the engaging includes providing a lock frame having a control surface lock in a shaft-engaged position in which the control surface lock engages the power take-off shaft and having a lock pin engaged with a locking pin slot of a lock ring thereby maintaining the lock frame in the shaft-engaged position.

17. The method according to claim 16, wherein the disengaging includes moving the lock ring from a first position to a second position in which the lock pin of the lock frame disengages the locking pin slot of the lock ring.

18. The method according to claim 17, wherein the disengaging includes moving the lock frame from the shaft-engaged position to a shaft-disengaged position in which the control surface lock disengages the power take-off shaft when the lock ring is moved from the first position to the second position and the lock pin of the lock frame disengages the locking pin slot of the lock ring.

19. The control surface restraining system of claim 1, wherein the control surface restraining system includes the tactical flight vehicle, wherein the lock ring is rotatable around a longitudinal axis of the tactical flight vehicle.

20. A control surface restraining system for preventing movement of a control surface imparted by a control actuation shaft of a control actuation section of a tactical flight vehicle, the control surface restraining system comprising:
   a power take-off shaft operably connected to the control actuation shaft with a power take-off gear train; and
   a control surface restraint configured to:
      engage the power take-off shaft, thereby locking the power take-off gear train and preventing the control actuation shaft from imparting the movement of the control surface, and
      disengage the power take-off shaft, thereby unlocking the power take-off gear train and allowing the control actuation shaft from imparting the movement of the control surface;
   wherein the control surface restraint includes a control surface lock, a pin and a lock ring, wherein the lock ring is disposed in a first position in which the pin engages the lock ring to maintain the lock ring in the first position and the control surface lock engages the power take-off shaft.

21. The control surface restraining system of claim 20, wherein the pin is configured to move out of engagement with the lock ring rotating the lock ring from the first position to a second position to disengage the control surface lock from the power take-off shaft.

22. The control surface restraining system of claim 20, wherein the control surface restrain further includes a ring biasing member fixed to the lock ring and configured to move the lock ring from the first position to the second position when the pin is moved out of engagement with the lock ring.

23. The control surface restraining system of claim 20, wherein the control surface restraining system includes the tactical flight vehicle, wherein the lock ring is rotatable around a longitudinal axis of the tactical flight vehicle.

\* \* \* \* \*

UNITED STATES PATENT AND TRADEMARK OFFICE
CERTIFICATE OF CORRECTION

| | | |
|---|---|---|
| PATENT NO. | : 12,296,942 B2 | Page 1 of 1 |
| APPLICATION NO. | : 17/929127 | |
| DATED | : May 13, 2025 | |
| INVENTOR(S) | : Seasly et al. | |

It is certified that error appears in the above-identified patent and that said Letters Patent is hereby corrected as shown below:

On the Title Page

In item (71), in "Applicant", in Column 1, Line 1, delete "Waltham, MA" and insert --Arlington, VA-- therefor Signed and Sealed this
Fifth Day of August, 2025

Coke Morgan Stewart
*Acting Director of the United States Patent and Trademark Office*